United States Patent [19]

Räsänen

[11] Patent Number: 5,457,531
[45] Date of Patent: Oct. 10, 1995

[54] MOVABLE MIRROR MOUNTING MECHANISM IN A SCANNING INTERFEROMETER

[75] Inventor: Jaakko Räsänen, Espoo, Finland

[73] Assignee: Temet Instruments Oy, Helsinki, Finland

[21] Appl. No.: 259,254

[22] Filed: Jun. 13, 1994

[30] Foreign Application Priority Data

Jun. 17, 1993 [FI] Finland ................................ 932816

[51] Int. Cl.$^6$ ........................................ G01B 9/02
[52] U.S. Cl. .................... 356/345; 356/346; 356/244
[58] Field of Search .............................. 356/345, 346, 356/244

[56] References Cited

U.S. PATENT DOCUMENTS

| | | | |
|---|---|---|---|
| Re. 32,912 | 4/1989 | Doyle | 356/346 |
| 4,095,899 | 6/1978 | Vanasse . | |
| 4,095,900 | 6/1978 | Murphy et al. . | |
| 4,319,843 | 3/1982 | Gornall | 356/346 |
| 4,383,762 | 5/1983 | Burkert | 356/346 |
| 4,773,757 | 9/1988 | Doyle | 356/346 |
| 4,795,253 | 1/1989 | Sandridge et al. | 356/346 |
| 4,991,961 | 2/1991 | Strait | 356/346 |
| 5,048,970 | 9/1991 | Milosevic et al. | 356/345 |
| 5,066,990 | 11/1991 | Rippel | 356/345 |
| 5,159,405 | 10/1992 | Ukon | 356/346 |

FOREIGN PATENT DOCUMENTS

| | | | |
|---|---|---|---|
| 83702 | 4/1991 | Finland | 356/346 |
| 3736694 | 6/1989 | Germany . | |
| 87/02448 | 4/1987 | WIPO | 356/346 |

*Primary Examiner*—Samuel A. Turner
*Assistant Examiner*—Jason D. Eisenberg
*Attorney, Agent, or Firm*—Merchant, Gould Smith, Edell, Welter & Schmidt

[57] ABSTRACT

A scanning interferometer includes an optical arrangement. The optical arrangement therein includes two mirrors diverting the travel direction of light, arranged back-to-back such that they reflect to opposite directions and that their optical axes join. The mirrors are arranged in a mounting, which is arranged to move back and forth by a moving mechanism. The mounting includes a base element supported by the body of the interferometer, at least two support arms connected with the base element at their first ends via first bending points and a mounting element connected with the second ends of the support arms via second bending points, the mirrors being fastened to the mounting element. The mechanism moving the mounting includes a assembly generating a linear back-and-forth movement and a transmission mechanism for converting the back-and-forth movement to a back-and-forth movement of the mounting element.

4 Claims, 2 Drawing Sheets

MOVABLE MIRROR MOUNTING MECHANISM IN A SCANNING INTERFEROMETER

FIELD OF THE INVENTION

The invention concerns a scanning interferometer comprising a light source, an optical arrangement for splitting the light emitted by the light source to travel over two different paths, for diverting it such that it returns over the same path and reuniting it as interfering light, said optical arrangement comprising two mirrors diverting the travel direction of light, a mounting for at least one of the mirrors diverting the travel direction of light and a moving mechanism for moving said mounting back and forth.

When in an interferometer of the type described above the paths of light are of the same magnitude, interference maxima of all wavelengths of light are attained. When an evenly changing path difference is effected between these paths e.g. by moving one or both of the mirrors that divert the travel direction of light, the wavelengths of the light passed through the interferometer can be detected with the aid of the interferences of the different wavelengths.

However, the known interferometer of the type described in the introductory paragraph involves problems relating to the mechanism that moves the mirror diverting the travel direction of light. The known interferometers are very demanding in respect of said moving mechanism. Generally, interferometers are very sensitive to even slight disturbances in the movement or orientation of the mirrors, even to the disturbances caused by the mounting on bearings. In a typical solution used in an interferometer, the mass of the moveable mirror is great and the mirror is mounted on air bearings, whereby it can be made to move as evenly as possible e.g. by means of a solenoid. This kind of structure may be optimal in laboratory conditions when the interferometer has been focused carefully, but even slight disturbances in the focusing or external effects particularly in the moving direction of the mirror may thoroughly disrupt the operation of the device.

SUMMARY OF THE INVENTION

The object of the present invention is to provide a scanning interferometer in which the above problems have been solved by rendering the moving mechanism insensitive to external disturbances to such an extent that the interferometer can be used even in field conditions. This is achieved with the interferometer according to the invention, which is characterized in that the mounting comprises a base element supported by the body of the interferometer, at least two support arms connected with the base element at their first ends via first bending points and a mounting element connected with the second ends of the support arms via second bending points, at least one of the mirrors diverting the travel direction of light being fastened to said mounting element, and that the mechanism moving the mounting comprises a means generating a linear back-and-forth movement and a transmission mechanism by means of which the movement of the means generating the back-and-forth movement is converted to a back-and-forth movement of the mounting element.

In the solution according to the invention, the moveable mirror is fixed to a continuously guided mounting, which forms a kind of pendulum, which however makes the mirror move linearly thanks to its at least two arms. Since the mirror is thus supported very firmly and the back-and-forth movement is transmitted to the mirror by a transmission mechanism, the structure provided is very stable.

Advantageously, the transmission mechanism comprises a base element supported by the body of the interferometer, at least two support arms connected with the base element at their first ends via first bending points and a transmission element which is connected with the second ends of the support arms via second bending points and provided with a wedge surface that transmits the movement to the mounting element, whereby the directions of movement of the mounting element and the transmission element are perpendicular to each other. When a pendulum structure essentially of the type of the mirror mounting is used as a transmission mechanism, the moving mechanism is rendered very insensitive to external disturbances and minor inaccuracies in the movement generated by the means that generates the back-and-forth movement. Particularly advantageously, the transmission mechanism is arranged to convert the bigger movement of the means generating the back-and-forth movement to a smaller back-and-forth movement of the mounting element, the movement being smaller advantageously by one order of magnitude. Thus the movement of the moving means measured in millimeters is converted to a movement that can be measured in tenths of millimeters, whereby any inaccuracies in the movement of the moving means also diminish to a tenth as the movement is transmitted to the mirror.

BRIEF DESCRIPTION OF THE DRAWINGS

In the following the scanning interferometer according to the invention will be described in greater detail with reference to the accompanying drawing, wherein.

DESCRIPTION OF THE PREFERRED EMBODIMENT

Figure 1:
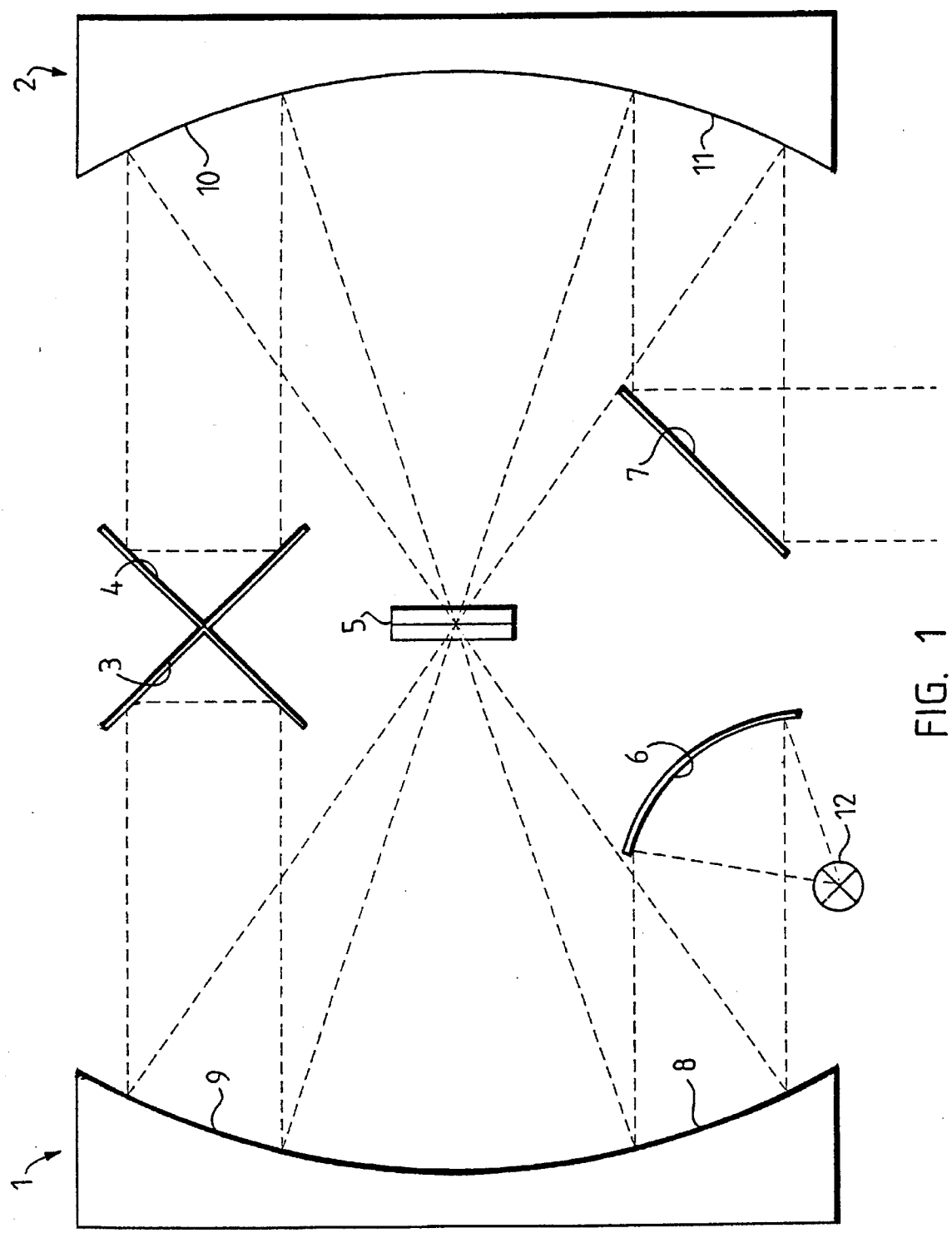
FIG. 1 shows a schematic view of an exemplary optical arrangement of the interferometer according to the invention.

FIG. 1 shows a schematic view of the general structure of the optical arrangement in a scanning interferometer according to the invention implemented as a focusing interferometer. The arrangement comprises a source of light 12, which is advantageously a light source emitting infrared light. The light from the light source is collimated by an off-axis parabolic mirror 6 to a focusing mirror surface 8, which focuses it on a beam splitter 5. Part of the light is reflected from the beam splitter to a collimating mirror surface 9, and part of it passes through the beam splitter 5 onto a collimating mirror surface 10. The focusing mirror surface 8 and the collimating mirror surface 9 form part of a uniform spherical mirror surface 1. The mirror surface 9 collimates the light, directing it to a cube corner 3, whose optical axis is arranged to be parallel to the beams collimated by the mirror surface 9. The cube corner comprises three flat mirror surfaces that are perpendicular to one another and are arranged to reflect to the direction of the point where the normals of the mirror surfaces intersect. In practice, the mirror 3 thus looks like a cube corner when seen from the inside of the cube. The cube corner 3 reflects the beam back to the mirror 9, from which it is focused on the beam splitter 5 and partly through it on a collimating mirror surface 11.

The path of the light emitted by the focusing mirror surface 8 and passed through the beam splitter 5 proceeds to a collimating mirror surface 10, which collimates the light to a cube corner 4, which is structurally identical to the cube corner 3. The cube corners 3 and 4 are arranged back-to-back such that they reflect to opposite directions and that their optical axes join. In practice, the vertices of these cube corners are arranged as close to each other as possible so that inclination of the mirrors has as small an effect as possible on the orientation of the beams of light they reflect. If the theoretical situation where the vertices of the cube corners 3 and 4 coincide were reached, no angle error whatsoever would occur. In practice this is not possible, however, but the present arrangement is essentially less sensitive to angle errors than an arrangement comprising two flat mirrors arranged back-to-back. If with flat mirrors an inclination of only a few micrometers is allowed, with cube corners, an inclination of even a few hundred micrometers can be allowed. On account of this, the mirror moving mechanism can be simplified significantly from what it has been. It is noted that in the invention—just as with flat mirrors—movement perpendicular to the optical axis of the mirrors does not result in an angle error.

When the beam is returned from the cube corner 4, the mirror 10 focuses it back on the beam splitter 5, whereby part of it is reflected to the same direction as the light emitted by the mirror 9 and passed through the beam splitter 5. These two beams of light interfere with each other on all frequencies if the paths of light from the beam splitter 5 to the mirror 9 and further to the cube corner 3 on the one hand and from the beam splitter 5 to the mirror 10 and further to the cube corner 4 on the other hand are of the same magnitude. When these distances are changed, interference maxima are attained on different frequencies. When the distance is changed at an even rate, said interference maximum can be made to transfer evenly from one wavelength to the other. If it is possible to monitor the changes of distance as they take place, it is also possible to find the frequencies on which the interference maximum is attained at a given moment. In practice this is achieved by measuring the paths of light by means of a laser beam conducted over the same path as the interfering light. Since laser light is very monochromatic, its interference maxima are known, and it is thus also possible to identify the corresponding points in the light emitted by the interferometer.

In the interferometer according to FIG. 1, the interfering light is further conducted to the collimating mirror surface 11, which collimates the light and directs it to a flat mirror surface 7, after which the light proceeds outside the interferometer and further through the sample to be analyzed to a suitable detector. These conventional structural components are not described in greater detail in the present application. In the interferometer according to FIG. 1, the mirror surface 10 and the mirror surface 11—like the mirror surfaces 8 and 9—are combined to provide a single uniform mirror surface 2, which is advantageously a spherical mirror surface. Due to this, the spectrometer according to the invention is especially compact and the mirrors 10 and 11 can be focused on the beam splitter 5 by a single action. Another practical advantage achieved is that the combined mirror surfaces 1 and 2 may be mutually identical spherical mirror surfaces, which further reduces the costs of manufacture of the interferometer according to FIG. 1.

Figure 2:
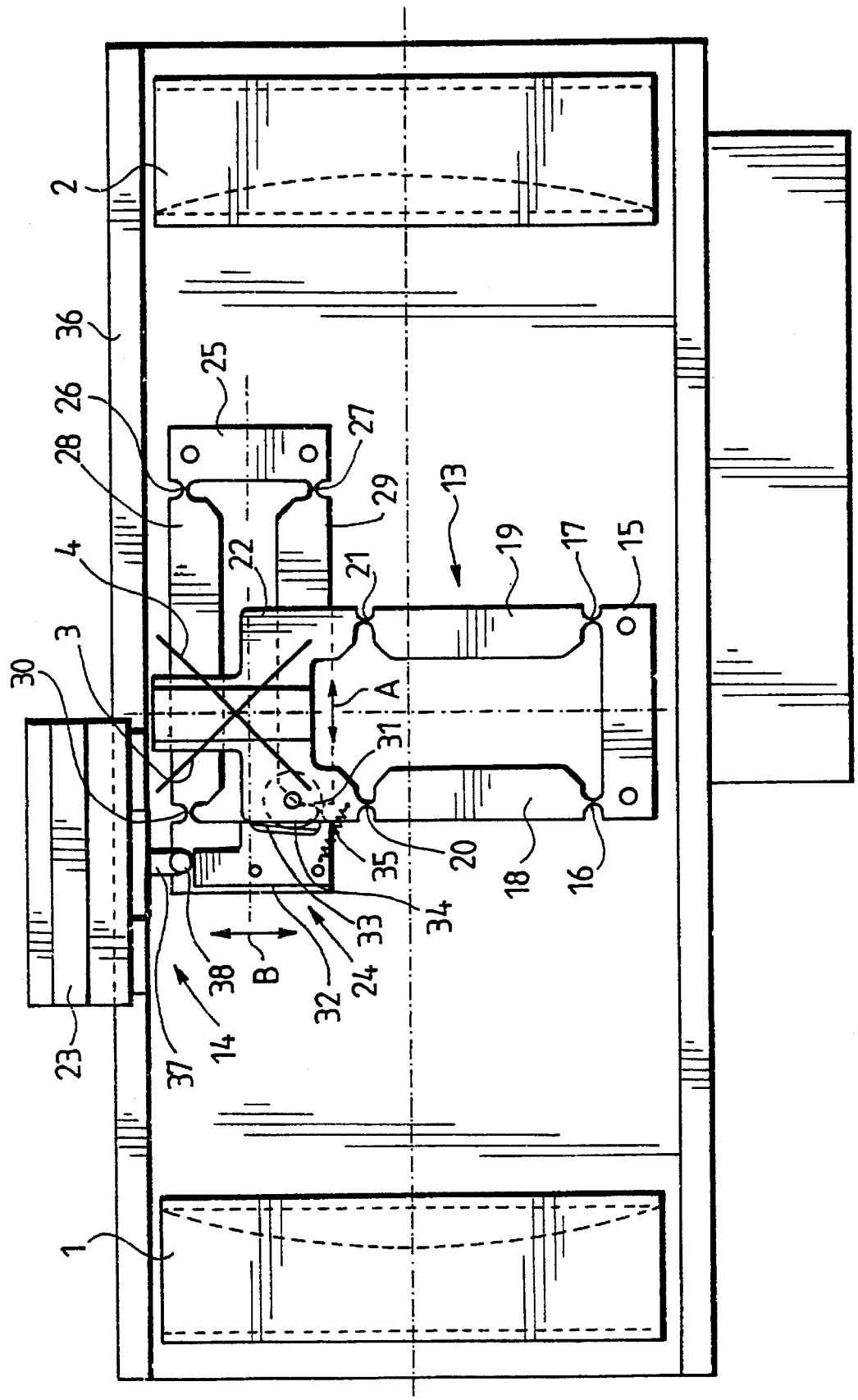
FIG. 2 shows a schematic view of a mechanism moving the interferometer according to the invention.

FIG. 2 illustrates the moving mechanism of the interferometer according to the invention that makes the mirrors 3 and 4 move back and forth. For this, the mirrors 3 and 4 are arranged in a mounting 13. The mounting 13 comprises a base element 15 supported by a body 36 of the interferometer, at least two support arms 18 and 19 connected with the base element 15 at their first ends via first bending points 16 and 17 and a mounting element 22 connected with the second ends of the support arms via second bending points 20 and 21, mirrors 3 and 4 diverting the travel direction of light being fastened to said mounting element. The mounting can be of plastic or metal. The mechanism for moving the mounting comprises a means 23 generating a linear back-and-forth movement and a transmission mechanism 24 for converting the movement generated by the means 23 generating the back-and-forth movement to a back-and-forth movement of the mounting element.

The transmission mechanism 24 comprises a base element 25 supported by the body 36 of the interferometer, at least two support arms 28 and 29 connected with the base element 25 at their first ends via first bending points 26 and 27 and a transmission element 32 connected with the second ends of the support arms 28 and 29 via second bending points 30 and 31. The transmission element 32 is provided with a wedge surface 33, which transmits the movement of the transmission element to the mounting element. The mounting 13 and the transmission mechanism are arranged such that the directions of movement of the mounting element 22 and the transmission element 32, indicated by arrows A and B, are perpendicular to each other.

The transmission mechanism 24 is arranged to be in contact with the mounting element 32 such that it converts the bigger movement of the means 23 generating the back-and-forth movement to a smaller back-and-forth movement of the mounting element 22, the movement being smaller advantageously by one order. The mounting element 22 comprises an advantageously curved slide surface 34, against which the wedge surface 33 of the transmission mechanism 24 is spring-loaded by a draw-spring 35 arranged between the mounting element 22 and the transmission element 32.

In practice, the means 23 generating the back-and-forth movement may be implemented by various mechanical solutions, but a particularly advantageous solution is presented by a structure in which the means 23 generating the linear back-and-forth movement comprises a cylindrical coil arranged to move in the air slot of a magnetic circuit. This kind of mechanism corresponds to the structure of a loudspeaker. By this kind of structure, a back-and-forth movement can be generated by supplying to the coil an alternating voltage of a suitable frequency. In the structure shown in the figure, the coil is connected with a pivot 37, which has a ball 38 at the end thereof, arranged to affect the transmission element 32 of the transmission mechanism 14.

The scanning interferometer according to the invention is described above by means of one exemplary embodiment only, and it is to be understood that it can be modified in many different ways without deviating from the scope defined by the accompanying claims. The mechanism that produces the back-and-forth movement can also be implemented by some other structure than described above, particularly since the linear back-and-forth movement produced need not be nearly as even as in known interferometers thanks to the structure of the moving mechanism according to the invention. Further, the invention is described above only with reference to a focusing interferometer, but it is to be understood that in respect of the moving mechanism it can be applied as such to other kinds of scanning interferometers also, e.g. to the Michelson interferometer.

I claim:

1. A scanning interferometer comprising a light source, an optical arrangement for splitting a light emitted by the light source to travel over two different paths, for diverting the light such that the light returns over the same path and reuniting the light as interfering light, said optical arrangement comprising two mirrors diverting a travel direction of light, a mounting for at least one of the mirrors diverting the travel direction of light and a moving mechanism for moving said mounting back and forth, the mounting comprising a base element supported by a body of the interferometer, at least two support arms connected with the base element at their first ends via first bending points and a mounting element connected with the second ends of the support arms via second bending points, at least one of the mirrors diverting the travel direction of light being fastened to said mounting element; and the mechanism moving the mounting comprising a means generating a linear back-and-forth movement and a transmission mechanism by means of which the movement of the means generating the back-and-forth movement is converted to a back-and-forth movement of the mounting element; the transmission mechanism comprising a base element supported by the body of the interferometer, at least two support arms connected with the base element at their first ends via first bending points and a transmission element which is connected with the second ends of the support arms via second bending points and provided with a wedge surface that transmits the movement to the mounting element, whereby the directions of movement of the mounting element and the transmission element are perpendicular to each other.

2. An interferometer according to claim 1, wherein the transmission mechanism converts a first movement of the means generating the back-and-forth movement to a second back-and-forth movement of the mounting element, the first movement is bigger than the second movement, the second movement being smaller by one order of magnitude.

3. An interferometer according to claim 1, wherein the mounting element comprises a curved slide surface, against which the wedge surface of the transmission mechanism is spring-loaded by a draw-spring arranged between the mounting element and the transmission element.

4. An interferometer according to claim 1, wherein the means generating the linear back-and-forth movement comprises a cylindrical coil arranged to move in an air slot of a magnetic circuit.

* * * * *